(12) United States Patent
Kunarathnam et al.

(10) Patent No.: US 9,118,593 B2
(45) Date of Patent: Aug. 25, 2015

(54) SYSTEM AND METHOD FOR BEST VALUE ROUTING

(75) Inventors: Jay Kunarathnam, Markham (CA); Theva Markandaier, Markham (CA); Michael Lin, Markham (CA); Ramesh Sivarajah, Markham (CA); Richard Ebach, Toronto (CA)

(73) Assignee: ENGHOUSE NETWORKS LIMITED, Ontario (CA)

( * ) Notice: Subject to any disclaimer, the term of this patent is extended or adjusted under 35 U.S.C. 154(b) by 567 days.

(21) Appl. No.: 12/899,858

(22) Filed: Oct. 7, 2010

(65) Prior Publication Data

US 2012/0087368 A1 Apr. 12, 2012

(51) Int. Cl.
*H04L 12/28* (2006.01)
*H04L 12/725* (2013.01)
*H04L 29/06* (2006.01)
*H04L 29/08* (2006.01)

(52) U.S. Cl.
CPC .......... *H04L 45/308* (2013.01); *H04L 65/1069* (2013.01); *H04L 67/306* (2013.01)

(58) Field of Classification Search
CPC ..... H04M 3/24; H04M 1/2535; H04M 3/493; H04M 45/308
USPC ......... 370/238, 254, 255, 351, 352, 389, 392, 370/400, 443, 468; 709/223, 235, 238
See application file for complete search history.

(56) References Cited

U.S. PATENT DOCUMENTS

| | | | |
|---|---|---|---|
| 5,884,043 A | 3/1999 | Teplitsky | |
| 5,905,958 A | 5/1999 | Houde | |
| 6,088,333 A | 7/2000 | Yang et al. | |
| 6,128,379 A | 10/2000 | Smyk | |
| 6,347,078 B1 | 2/2002 | Narvaez-Guarnieri et al. | |
| 6,389,400 B1 | 5/2002 | Bushey et al. | |
| 6,407,988 B1 | 6/2002 | Agraharam et al. | |
| 6,426,955 B1 | 7/2002 | Gossett et al. | |
| 6,446,076 B1 | 9/2002 | Burkey et al. | |
| 6,587,438 B1 | 7/2003 | Brendel | |
| 6,697,335 B1 | 2/2004 | Ergun et al. | |
| 6,795,539 B2 | 9/2004 | Culli et al. | |
| 6,873,616 B1 | 3/2005 | Fedyk et al. | |
| 6,922,465 B1 * | 7/2005 | Howe .............................. | 379/76 |

(Continued)

FOREIGN PATENT DOCUMENTS

| | | |
|---|---|---|
| CA | 2256938 | 6/2000 |
| WO | 2006121283 | 11/2006 |
| WO | 2009032366 | 3/2009 |

OTHER PUBLICATIONS

Suri, Subhash, Marcel Waldvogel and Priyank Ramesh Warkhede, "Profile-Based Routing: A New Framework for MPLS Traffic Engineering", Washington University Computer Science Technical Report, Jul. 2001.

(Continued)

*Primary Examiner* — Brian O'Connor
(74) *Attorney, Agent, or Firm* — Adam R. Stephenson, Ltd.

(57) ABSTRACT

A system determines, in real-time, the routing of communication services from origination to destination based on a number of selected criteria used to determine an optimal path. Best value routing enables carriers and service providers to route a session/call by using an advanced intelligent network solution to generate optimal routes/service providers for servicing a request.

25 Claims, 6 Drawing Sheets

(56) References Cited

U.S. PATENT DOCUMENTS

| | | | |
|---|---|---|---|
| 7,020,087 B2 * | 3/2006 | Steinberg et al. | 370/238 |
| 7,023,808 B2 | 4/2006 | Ball et al. | |
| 7,050,555 B2 | 5/2006 | Zargham et al. | |
| 7,065,193 B2 | 6/2006 | Culli et al. | |
| 7,072,331 B2 | 7/2006 | Liu et al. | |
| 7,139,387 B2 | 11/2006 | Dahari | |
| 7,224,789 B2 | 5/2007 | Ekstrom et al. | |
| 7,242,753 B2 | 7/2007 | Culli et al. | |
| 7,251,479 B2 | 7/2007 | Holder et al. | |
| 7,272,133 B2 | 9/2007 | Valin et al. | |
| 7,274,776 B1 | 9/2007 | Virzi et al. | |
| 7,299,259 B2 | 11/2007 | Petrovykh | |
| 7,339,937 B2 | 3/2008 | Mitra et al. | |
| 7,372,952 B1 | 5/2008 | Wu et al. | |
| 7,406,539 B2 | 7/2008 | Baldonado et al. | |
| 7,457,279 B1 * | 11/2008 | Scott et al. | 370/352 |
| 7,539,741 B2 | 5/2009 | Liong et al. | |
| 7,561,526 B2 | 7/2009 | Naden et al. | |
| 7,577,108 B2 | 8/2009 | Zhang et al. | |
| 7,656,805 B2 | 2/2010 | Vigouroux et al. | |
| 7,809,851 B2 * | 10/2010 | Klemets | 709/231 |
| 7,839,988 B2 * | 11/2010 | Schneider et al. | 379/142.05 |
| 8,040,808 B1 * | 10/2011 | Kasturi et al. | 370/238 |
| 8,090,086 B2 * | 1/2012 | Chang | 379/88.18 |
| 8,171,156 B2 * | 5/2012 | Audenaert et al. | 709/235 |
| 2004/0233850 A1 | 11/2004 | Randriamasy et al. | |
| 2006/0206604 A1 | 9/2006 | O'Neil et al. | |
| 2006/0256724 A1 | 11/2006 | Martini et al. | |
| 2007/0049329 A1 * | 3/2007 | Mayer et al. | 455/552.1 |
| 2007/0173226 A1 | 7/2007 | Cai et al. | |
| 2007/0192465 A1 | 8/2007 | Modarressi | |
| 2007/0206573 A1 | 9/2007 | Silver | |
| 2007/0206584 A1 | 9/2007 | Fulling et al. | |
| 2008/0008178 A1 | 1/2008 | Tychon et al. | |
| 2008/0101356 A1 | 5/2008 | Babbar et al. | |
| 2009/0185491 A1 | 7/2009 | Schollmeier et al. | |
| 2009/0268636 A1 | 10/2009 | Zolfaghari et al. | |
| 2010/0002604 A1 | 1/2010 | Melick et al. | |

OTHER PUBLICATIONS

Gao, Biao, Yibin Yang and Charles Chen, "Implementing a Constraint-based Shortest Path First Algorithm in Intelligent Optical Networks", Mahi Networks, May 5, 2003.

Mellouk, A. Hoceini, S. Baguenine, F. Cheurfa, "Distributed Quality-of-Service Routing of Best Constrained Shortest Paths", IEEE Symposium on Computers and Communications, Jul. 6-9, 2008.

* cited by examiner

Figure 1 – BEST VALUE ROUTING OVERVIEW

Figure 2 – Signaling Node Architechture

Figure 3 – AINP ARCHITECHTURE

Figure 6

SYSTEM AND METHOD FOR BEST VALUE ROUTING

FIELD OF INVENTION

The present invention relates generally to real time session control for network routing, and more specifically to determining a best value route over a network utilizing metrics associated with cost, network and business intelligence optimization.

BACKGROUND OF THE INVENTION

Because traditional circuit based switches are structured in an integrated and closed architecture, they often fail to meet diversified requirements and/or enable rapid deployment of services over an entire network. To meet operational needs, conventional switching networks are evolving from a traditional voice services networks to networks offering additional services. For example, peer-to-peer (P2P) networks are becoming more widely used as the demand for clearer real-time voice communication grows and telecommunication companies turn to existing P2P, Internet based networks to fulfill the demand.

While today's major telecom market players are largely incumbent local exchange carriers (ILECs), competitive local exchange carriers (CLECs), and PTTs (government agencies responsible for postal mail, telegraph, and telephone services), as networks and services converge new service providers such as Yahoo®, Google®, MSN® and Skype® begin to compete in the telecom arena. For instance, Skype currently uses P2P technology and research organizations are moving towards implementing P2P networks for cellular use.

Essentially, telecommunications is in the process of transforming into an all-IP fixed mobile convergence (FMC) based architecture and ubiquitous network. NGN (next generation) and long-term evolution (LTE) and/or IP multimedia system networks represent the movement towards this goal. Not only are networks progressing towards converged architectures but carriers are also offering diversified and eventually integrated applications and services. In addition to converged networks and diversified applications and services, Intelligent Networking (IN) is also shaping telecommunications. IN is intended for fixed and mobile telecom networks and provides value added services in addition to standard telecom services like public switched telephone network (PSTN), code division multiple access (CDMA) and global system for mobile communications (GSM) services on mobile phones.

As telecommunications moves into the next generation of network convergence and diversified applications, service providers will need to remain competitive and profitable by offering value added converged routing services. With telecom, IT and Internet, media and consumer electronic industries merging, platforms which route sessions (e.g., voice, data, multimedia, etc.) from subscriber devices (e.g., personal media device, computer, mobile phone, TV, etc.) through the network using intelligent routing capabilities will be one of these value added services.

Therefore, there is a long-felt need to provide an advanced intelligent network platform that determines a best value route in real-time based upon a plurality of data and optimization algorithms.

SUMMARY OF THE INVENTION

The present invention enables a real time open, flexible, vendor agnostic intelligent network routing to carriers and service providers. In an embodiment, an advanced intelligent network platform (AINP) determines, in real-time, a best value route for a communication request based upon a plurality of factors and using multiple logic modules.

In an embodiment, an AINP system determines in real-time a best value route for transporting content across a network. The AINP receives a request from a service delivery platform (SDP). The request comprises session parameters, such as, for example, an origin and a destination. The AINP uses the session parameters to retrieve a subscriber profile and determines, based upon the session parameters and the subscriber profile, a plurality of route optimization modules and an execution order of the plurality of route optimization modules. The AINP executes the route optimization modules based upon the execution order. The AINP determines a best value route for routing the content from the origin to the destination and provides the best value route. In an embodiment, a best value route is sent to the SDP, the carrier, the network, a service provider, a subscriber device, etc.

BRIEF DESCRIPTION OF THE DRAWINGS

The invention will hereinafter be described in conjunction with the appended drawing figures, wherein like numerals denote like elements, and:

FIG. 6 is a depiction of an exemplary graphical user interface, in accordance with one aspect of the present invention.

DETAILED DESCRIPTION

Figure 1:
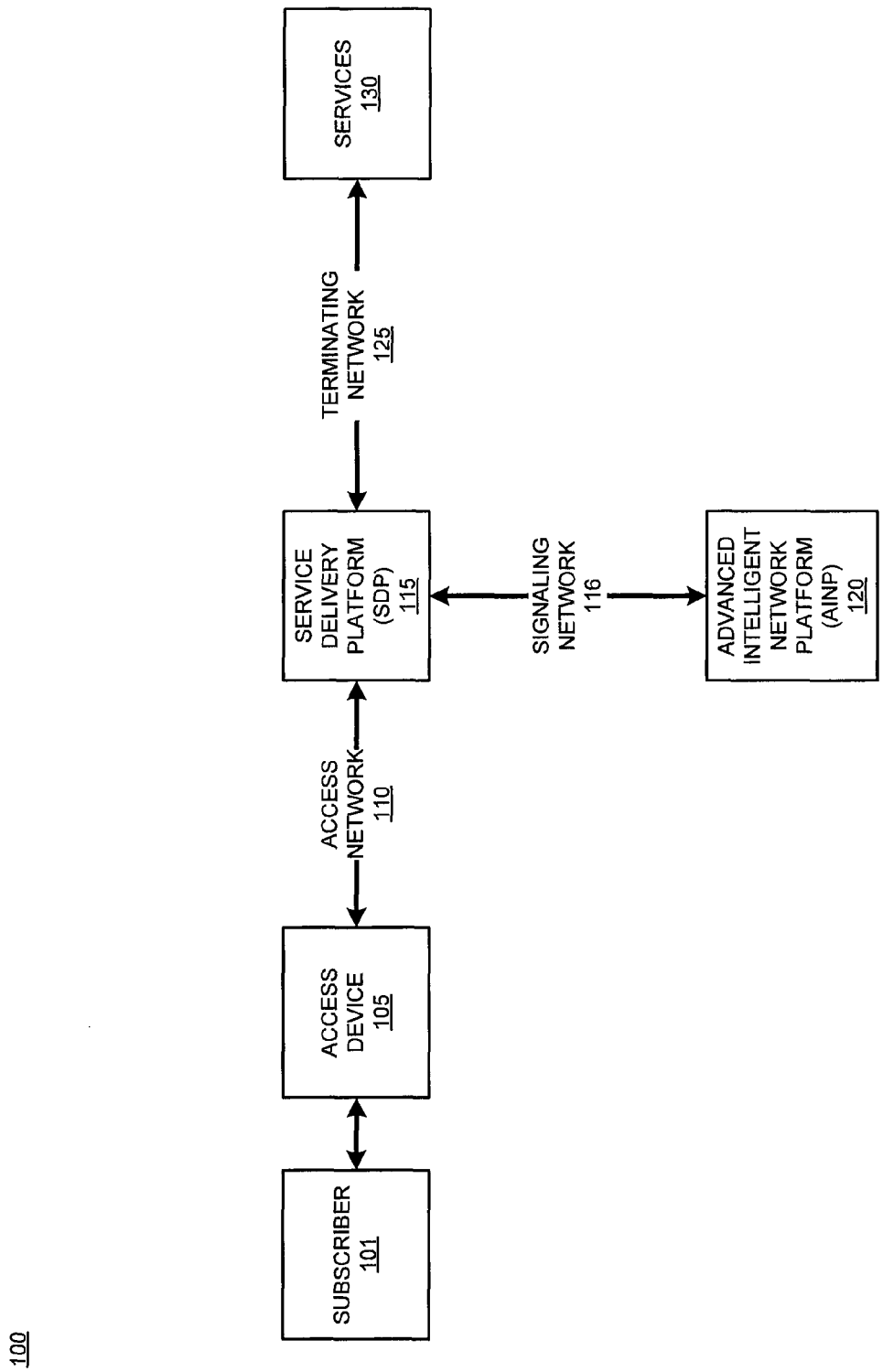
FIG. 1 is a schematic block diagram illustrating an exemplary system overview, in accordance with one aspect of the present invention.

The present invention improves upon existing systems by providing a unique, comprehensive, real-time network signaling system and method for managing telecommunication business. A real time enabled, open, flexible, vendor agnostic AINP allows carriers and service providers to intelligently route sessions through a network.

While the embodiments described herein are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In one embodiment, the system includes a user interface (UI), software modules, logic engines, numerous databases, computers/servers and computer networks. While the system may contemplate upgrades or reconfigurations of existing processing systems, changes to existing databases and system tools are not necessarily required by the present invention. While the description references specific technologies, hardware, equipment, system architectures and data management techniques, practitioners will appreciate that this description is but one embodiment and that other devices and/or methods may be implemented without departing from the scope of the invention.

"Entity" may include any individual, customer, caller, consumer, group, business, organization, government entity, account holder, software, hardware, and/or any other entity.

"User" and "subscriber" shall interchangeably refer to any entity that accesses and uses the system of the invention.

"Carrier," "Supplier" and "Service Provider" include any entity that provides telecommunication and/or network transport services.

"Online" includes interactive communications that take place between remotely located subscribers, including communication through any of the networks or communications means described herein.

"Subscriber ID" includes any device, code, or other identifier suitably configured to allow a carrier and/or the INP to identify a subscriber.

"Subscriber profile" includes any data used to characterize a subscriber, the subscriber preferences, subscriber device configurations, subscriber data and or subscriber contractual obligations or agreements.

"Subscriber device" or "access device" includes any hardware or software configured to transmit, request, receive and/or render content (e.g., data, voice, video, graphics, text, etc.) across a network. For example, a subscriber device may include a personal media device, computer, cell phone, a mobile device, a television, a portable computing device, a gaming console or platform, etc.

"Data analysis", as used herein, shall be understood to comprise statistical modeling, regression analyses, optimization techniques, systems analysis, operations research tool, market segmentation analyses, econometrics, financial analyses, budgeting analyses, and/or the like.

With reference now to FIG. 1 shows an embodiment of a high level conceptual system design for determining a best value route using an INP. In this exemplary embodiment, subscriber device 101 sends a request via an access network 110 to a service delivery platform (SDP) 115. AINP 120 determines optimal route(s) in real-time and SDP 115 completes the subscriber request via the terminating network 125 to provide services 130 to the subscriber 101.

In an embodiment, AINP 120 is configured to run on a converged backbone. As such, access network 110, signaling network 116 and/or terminating network 125 may include wireline, wireless/mobile, cable, IP and long-term evolution ("LTE")/IP multimedia subsystem ("IMS") networks, and may process entertainment-related (e.g., television, video, etc.), goods and services-related (e.g., a pizza delivery order), and communications-related (e.g., LTE/IMS, multimedia messaging service ("MMS"), voice, etc.) sessions. Sessions may originate from any number of subscriber devices 101. In an embodiment, the subscriber has various subscriber devices and applications set up with their carrier. In various embodiments, AINP 120 supports any kind of session based application such as, for example:

TV—sends goods and services-related data, music and streaming video session requests;

Cell phone—send IMS and short message service ("SMS"), voice and content (e.g., wallpaper graphics, ring tones, etc.) session requests; and Computer—sends video, music and email session requests.

In an embodiment, the types of applications enabled by AINP 120 include:

Goods and services: such as but not limited to pizza orders and car service inquiries;

Entertainment: such as but not limited to video, streaming video and TV; and

Communications: such as but not limited to IMS, SMS and voice.

Depending on the subscriber device capabilities and/or the type of subscriber account (e.g. a subscriber's account with their carrier), subscriber device 101 sends communication and data across access network 110 to SDP 115. SDP 115 may include a telecommunication or network control device such as, for example, a session control device, a switching platform, a class 4 switch, a class 5 switch, a class 4/5 switch, a next generation network (NGN) platform, a mobile switching center (MSC), a router, a gateway, a service broker gateway), an IMS framework, a call session control function (CSCF) device, a proxy server, a session initiated protocol (SIP) server, a SIP/enum server, an LTE framework, an evolved packet core (EPC), an SS7 node, a SIGTRAN node, a multimedia resource function (MRF) server, etc.

In one exemplary embodiment, AINP 120 accommodates diverse network topology by processing sessions originating from multiple connector and network types, such as, for example, SS7 connectors for time division multiplexing (TDM) networks (e.g., for wireline access points), session initiation protocol (SIP) connectors for NGN networks (e.g., for cable/IP access points) and ISC/Diameter connectors for LTE/IMS networks (e.g., for wireless/mobile access points such as, e.g., 3G/2.5G, LTE, Universal Mobile Telecommunications System (UMTS), High Speed Packet Access (HSPA), GSM, CDMA, evolution data optimized (EVDO), and wireless local area networks (e.g., WIFI, WiMax, etc.)). For the sake of brevity, a detailed discussion of telecommunications/networking technologies is not included herein. However, one of skill in the art will recognize that the present invention may support any type of protocols/standards. An exemplary list of protocols/standards is listed in the table below.

| Protocol | Standards |
|---|---|
| SIGTRAN | M3UA (IETF RFC 3332 RFC 2960) |
| | M2PA (IETF Internet draft SS7) |
| | MTP2 (IETF RFC 2960) |
| | MTP (TU-T Q.703, Q.704, Q.707, Q.752, Q.791, ANSI - T1.111.3, 1.111.4) |
| | ISUP [ITU-T Q.761-Q.764 (1997) Q.767 (1992), ETSI ETS 300 356-1 (1995), ANSI T1.113-1995, ITU-T Q.1901, Q1902.1-Q.1902.5 (2001)] |
| | SCCP [ITU-T Q.711-Q.714 (1993 or later), Q.791, ANSI T1.112-1992 or later] |
| | TCAP [ITU-T Q.771-Q.774 (1992) and ANSI T1.114 (1996), ITU-T Q.771-Q.774 (1997)] |
| | INAP/CAP (ETSI CS1 CS2, Q.1218 - ITU-T CS-1, TS 101 046 v5.6.0 v6.3.0 - CAMEL, TS 129 078 v4.6.0 - CAMEL, GR-1299-CORE - AIN) |
| | MAP [ETSI ETS 300 599 - (GSM 09.02), ETSI ETS 300 974 - (GSM 09.02), ETSI TS 100 974 - (GSM 09.02), TS 29.002] |

-continued

| Protocol | Standards |
|---|---|
| SS7 | MTP (TU-T Q.703, Q.704, Q.707, Q.752, Q.791, ANSI - T1.111.3, T1.111.4) |
| | ISUP [ITU-T Q.761-Q.764 (1997) Q.767 (1992), ETSI ETS 300 356-1 (1995), ANSI T1.113-1995, ITU-T Q.1901, Q1902.1-Q.1902.5 (2001)] |
| | SCCP [ITU-T Q.711-Q.714 (1993 or later), Q.791, ANSI T1.112-1992 or later] |
| | TCAP [ITU-T Q.771-Q.774 (1992) and ANSI T1.114 (1996), ITU-T Q.771-Q.774 (1997)] |
| | INAP/CAP (ETSI CS1 CS2, Q.1218 - ITU-T CS-1, TS 101 046 v5.6.0 v6.3.0 - CAMEL, TS 129 078 v4.6.0 - CAMEL, GR-1299-CORE - AIN) |
| | MAP [ETSI ETS 300 599 - (GSM 09.02), ETSI ETS 300 974 - (GSM 09.02), ETSI TS 100 974 - (GSM 09.02), TS 29.002] |
| SIP | RFC 3261 |
| | RFC 3264 |
| | RFC 3311 |
| | RFC 3262 |
| | RFC 3515 |
| | RFC 2387 |
| | RFC 3265 |
| | ENUM (RFC 3761) |
| LTE/IMS | IETF RFC 3261 |
| | 3GPP TS 23.218 |
| | 3GPP TS 23.228 |
| | 3GPP TS 24.228 |
| | 3GPP TS 29.328 |
| | IETF RFC 3588 |
| | IETF RFC 4006 |
| | 3GPP TS 29.278 |
| | 3GPP TS 23.278 |
| | 3GPP TS 29.078 |

In addition to the components described above, the system may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases.

As will be appreciated by one of ordinary skill in the art, one or more system components may be embodied as a customization of an existing system, an add-on product, upgraded software, a stand-alone system, a distributed system, a method, a data processing system, a device for data processing, and/or a computer program product. Accordingly, individual system components may take the form of an entirely software embodiment, an entirely hardware embodiment, or an embodiment combining aspects of both software and hardware. Furthermore, individual system components may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

In an embodiment, a user, such as a subscriber or an AINP 120 system administrator may access AINP 120 via a graphical user interface (GUI) by means of a client. A client may include an operating system (e.g., Windows XP, Windows NT, 95/98/2000, Vista, OS2, UNIX, Linux, Solaris, MacOS, Windows Mobile OS, Android, Windows CE, Palm OS, Symbian OS, Blackberry OS, J2ME, etc.) as well as various conventional support software and drivers typically associated with mobile devices and/or computers. The client may be in any environment with access to any network, including both wireless and wired network connections. In an embodiment, access is through a network or the Internet through a commercially available web-browser software package.

Any of the communications, inputs, storage, databases or displays discussed herein may be facilitated through a web site having web pages. The term "web page" as it is used herein is not meant to limit the type of documents and applications that may be used to interact with a user. For example, a typical web site may include, in addition to standard HTML documents, various forms, Java applets, JavaScript, active server pages (ASP), common gateway interface scripts (CGI), Flash files or modules, FLEX, ActionScript, extensible markup language (XML), dynamic HTML, cascading style sheets (CSS), helper applications, plug-ins, and/or the like. A server may include a web service that receives a request from a web server, the request including, for example, a URL (e.g., http://yahoo.com/) and an internet protocol ("IP") address. In an embodiment, the web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003).

Figure 3:
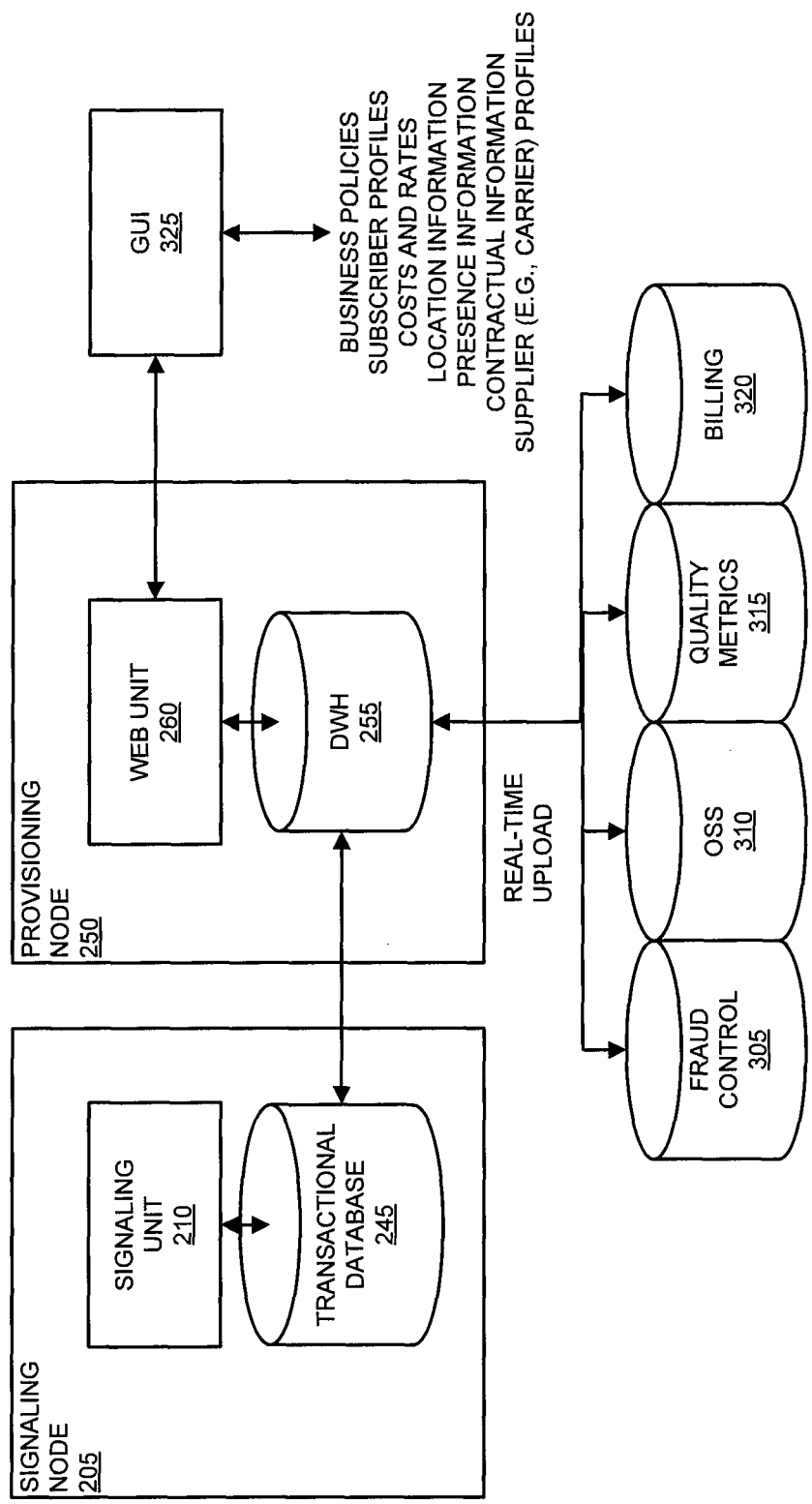
FIG. 3 is a schematic block diagram illustrating a detailed view of an exemplary signaling node architecture, in accordance with one aspect of the present invention.

FIG. 3 depicts databases that are included in an exemplary embodiment of the invention. An exemplary list of various databases used herein includes: a transaction database (TDB) 315, a data warehouse 330, an operational support system (OSS) database 335, a quality metrics database 340, a billing database 345, a fraud control database 350 and/or other databases that aid in the functioning of the system. As practitioners will appreciate, while depicted as separate and/or independent entities for the purposes of illustration, databases residing within the system may represent multiple hardware, software, database, data structure and networking components. Furthermore, embodiments are not limited to the exemplary databases described herein, nor do embodiments necessarily utilize each of the disclosed exemplary databases.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

Various database tuning steps are contemplated to optimize database performance. For example, frequently used files such as indexes may be placed on separate file systems to reduce In/Out ("I/O") bottlenecks.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

The systems and methods may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, Flash, ActionScript, FLEX, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

"Best Value Routing" (BVR) includes determining the most optimal routing for a session and applying real time business intelligence analytics within a session flow. In an embodiment, a session originates from the subscriber's device and terminates when the requested service is completed. In an embodiment, determining a BVR comprises manipulating a session. In one embodiment, real time session control receives network details in the form of network triggers to retrieve parameters at session setup and to compare the session details against database tables and service logic procedures to optimize the session according to business intelligence rules.

Figure 2:
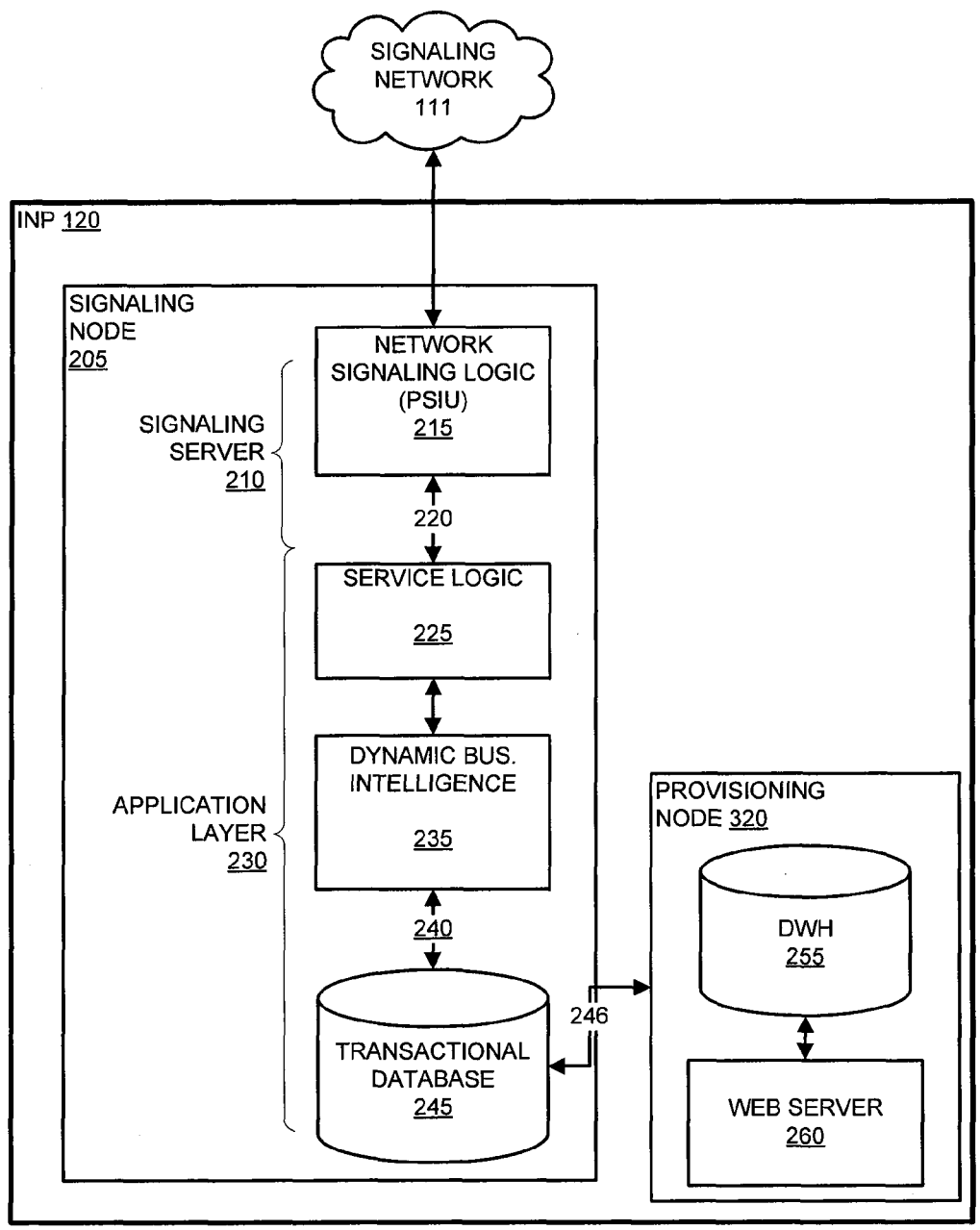
FIG. 2 is a schematic block diagram illustrating an exemplary signaling node architecture, in accordance with one aspect of the present invention.

In an embodiment, AINP 120 platform determines best value routing using two types of nodes: the signaling node(s) and the provisioning node(s). The signaling node consists of the signaling server/application layer and transactional databases (TDB), while the provisioning node consists of the web unit and the data warehouses (DWH). With reference now to FIG. 2, the signaling node's 205 PSIU (network signaling service logic) 215 layer receives and translates a session request and the service logic 225 layer and dynamic business intelligence 235 layer determine whether the TDB 245 should be invoked in order to process the session. In one embodiment, PSIU 215 is considered the signaling server 210 while the service logic 225, dynamic business intelligence 235 and TDB 245 components are considered the application layer 230. In an embodiment, if a session is rejected, TDB 245 is not invoked and the session is dropped.

However, if a session is to be processed, TDB 245 dynamic services are invoked and analyze/process the session, calculating BVR and creating the routing table(s) which are then sent back to the requesting entity (e.g., SDP 115). Although, in one embodiment, TDB 245 may not contact DWH 255 during session processing, DWH 255 constantly updates TDB 245 with the most recent routing parameters and data which TDB 245 use in determining the BVR. This is an ongoing process which occurs whenever DWH data changes, such as when updates are made or when business intelligence analytics are retrieved from an external system. In an exemplary embodiment, business intelligence is added to transactional data within the session flow itself, so it can be applied to a transaction and the routing results can be generated as a single process. For example, in an embodiment, TDB 245 is configured (e.g. using stored procedures or other processing logic) to obtain data (e.g. via a gateway, a direct database query, a data service, etc.) in real-time during the session flow. Thus, there is no time lag that typically occurs when the traditional method is used—i.e., the system does not have to wait for data to be analyzed and then for the analyzed data to be uploaded to the service delivery platform (e.g., switching device), since processing occurs as a single flow on a per session basis. By analyzing and harmonizing data within the call flow, AINP 120 enables BVR that ensures that sessions are routed through the network based on the most recent analytics available at the time that the session is received.

In one embodiment, provisioning node 250 includes two web servers and two DWHs. The web servers enable a GUI which, in an embodiment, is used to upload analytic parameters to DWH 255. These parameters contain information that is used in routing calculations such as, for example, supplier profiles, rate decks, quality metrics, user/device profiles, subscriber location data, network topology information, and any additional configuration details. Further, in an exemplary embodiment, provisioning node 250 retrieves data from other sources such as third party OS S's (e.g., quality of service (QoS) systems), runs background business intelligence analytics, and uploads real time network data that enable determination of real-time best value routing. In an embodiment, DWH 255 uploads data to TDB 245 on the network whenever the data changes and TDB 245 use the data when calculating BVR for a session.

In an embodiment, signaling node 205 contains two signaling units (which communicate with SDP 115 and includes PSIU 220, service logic 225 and dynamic business intelligence components 235) and two TDBs 245. PSIU 220 interprets and translates the network session request and then sends the request to the application layer. Service logic 225 and real time business analytics 235 invoke TDB 245 to analyze and process the session. In an embodiment, unique service logic is stored in the application layer and determines how the session is processed. TDBs 245 use service logic 225 to call a parsing engine and retrieve the session details (e.g., session parameters) and then invoke a processing logic module (e.g., a stored procedure or other module) to apply business intelligence analytics to the session. A BVR is determined and the TDB 245 sends the routing table(s) to SDP 115 which routes (i.e., terminates) the session through the network.

Figure 4:
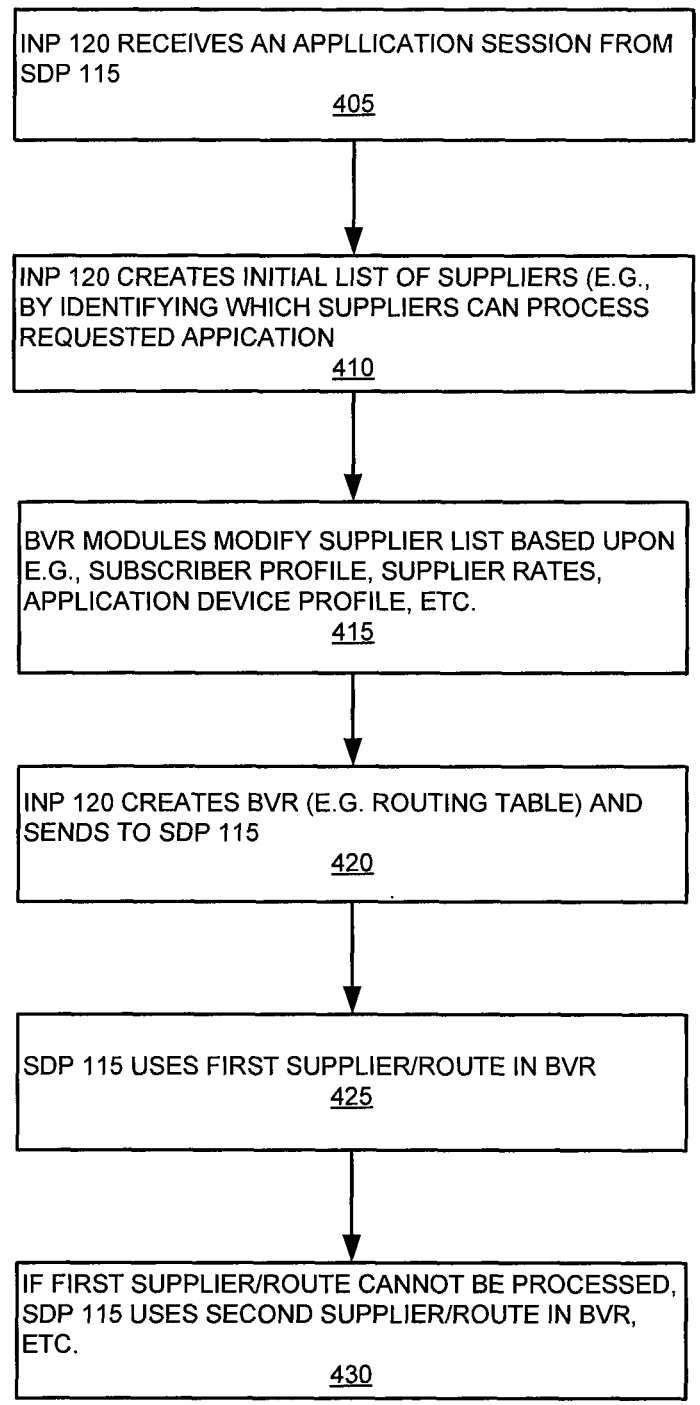
FIG. 4 is a flowchart illustrating an exemplary process for determining a best value route, in accordance with the present invention.
Figure 5:
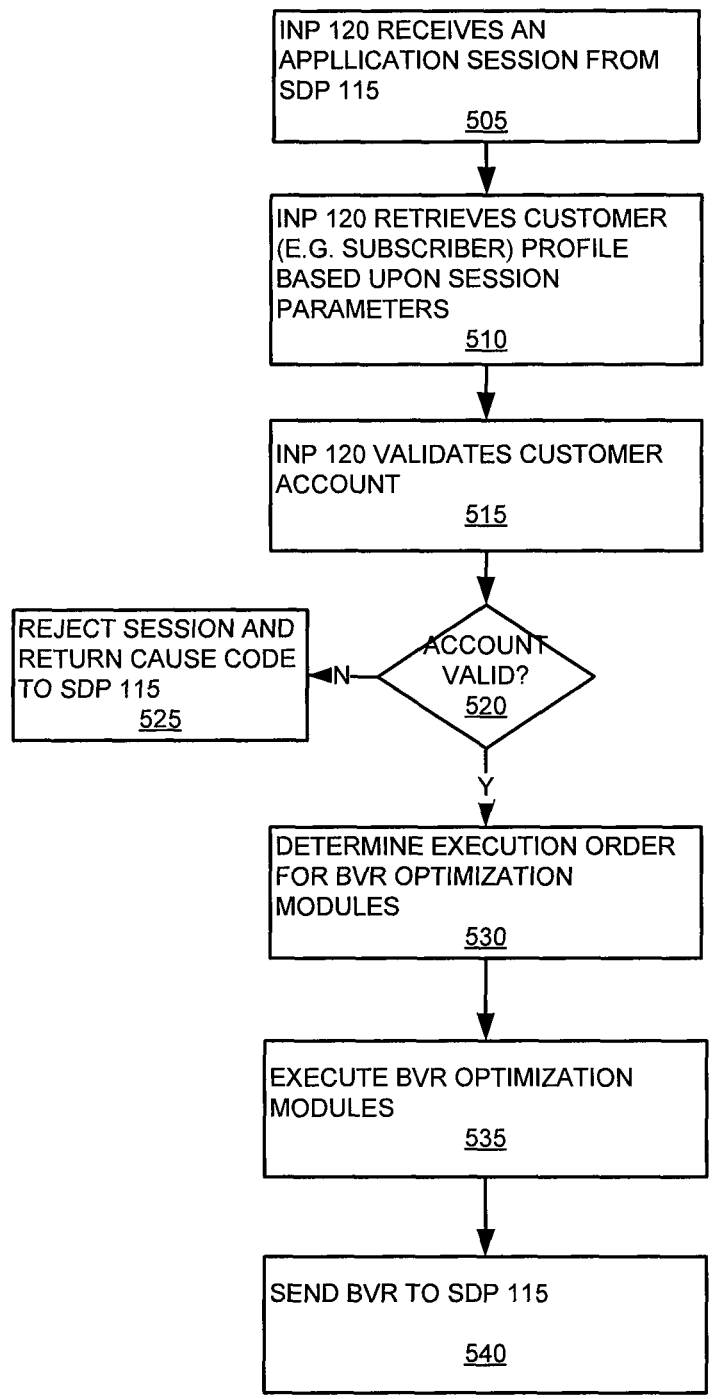
FIG. 5 is a flowchart illustrating an exemplary process for determining a best value route, in accordance with one aspect of the present invention.

Referring next to FIGS. 4 and 5, the process flows depicted in these figures are merely exemplary embodiments of the invention and are not intended to limit the scope of the invention as described above. It will be appreciated that the following description makes appropriate reference not only to the steps depicted in FIGS. 4 and 5 but also to the various system components as described above with reference to FIGS. 1-3.

FIG. 4 is flowchart illustrating an exemplary BVR process flow. AINP 120 receives a session from SDP 115 (step 405). AINP 120 creates an initial list of carriers (e.g., carrier, service provider, etc) by identifying which carriers can process the subscriber's application (Step 410). AINP 120 executes a plurality of BVR modules and modifies the supplier list based upon a variety of data and optimization methods (Step 415). The BVR is sent to SDP 115 (Step 420) which routes the session through the network using the supplier suggested in the BVR data (Step 425). In an embodiment, the BVR comprises a plurality of routing suggestions including a plurality of carriers and, if the session cannot be processed using a first BVR, the SDP is configured to try a second BVR (Step 430).

In an exemplary embodiment, SDP 115 receives a session request from the subscriber; the switching device sends the request to AINP 120. With reference again to FIG. 2, AINP 120 receives the request via signaling node 205 which translates the network request into a format TDB 245 can understand. When data changes, TDB 245 receives updated information from DWH 255. For example routing parameters such as, for example, supplier profiles, cost, business policies, and location information, real time network data, and $3^{rd}$ party database information (e.g., costing routes from third party billing platforms). In various embodiments, this data is used by AINP 120 in determining a BVR for a session.

The following examples of various types of sessions are presented for to illustrate certain features and capabilities of AINP 120. As such, the exemplary embodiments discussed below are solely for purposes of illustration only and not of limitation.

Voice Call Session: In one embodiment, AINP 120 manipulates a voice call session. A subscriber subscribes to a carrier, which uses AINP 120. After the subscriber initiates a voice call, the session is sent to AINP 120 to determine the BVR for the voice call. AINP 120 checks the subscriber's profile and determines that the subscriber can only use two types of long distance subscribers to terminate the call (for example, terminating the subscriber's call using a medium quality route at the cheapest cost). AINP 120 also looks at the subscriber's profile to determine if the subscriber account has had fraudulent calls in the past, and, in one embodiment, uses the carrier's business rules to ensure that the carrier's margins are maintained when choosing a supplier to terminate the call. AINP 120 provides a prioritized list (i.e. the BVR) of three suppliers to the switch (i.e., SDP 115) to terminate subscriber's call.

SMS Session: In an embodiment, AINP 120 manipulates an SMS session. For example, a subscriber in London, "Samantha" sends an SMS message to her friend, "Mohan," in India. Samantha does not know if Mohan has moved or changed locations and only has Mohan's phone number as contact information. Samantha initiates an SMS (or other text message format) message using her service provider. The service provider sends the session to AINP 120 which checks to see if the number has been ported by checking the global Number Portability database. AINP 120 determines that the number has been ported, and validates the carrier's business rules to find the shortest path to terminate the SMS session. Thus, Samantha saves large roaming fees and the service provider (e.g., carrier) maintains profitability. AINP 120 determines the best suppliers to use to terminate the session and sends the supplier info.

Video Session: In an embodiment, AINP 120 manipulates a video session. A subscriber may have multiple profiles (e.g., can maintain email, phone number, IMS contact info, etc.) and carriers/networks may check which type of sessions the subscriber can receive based on where they are in the network (i.e., networks have the ability to provide location and presence information on a subscriber). For example, a subscriber, "John," in New York initiates a video session to "Mary," who is originally based in New York but is currently roaming in Las Vegas. When John initiates a video session from his video compatible device (i.e., mobile phone), the session is sent to the carrier's network, and the carrier sends session information to AINP 120. AINP 120 receives John and Mary's uniform resource identifier ("URI") (e.g., contact info such as a phone number, email address, etc.) and, using the URI, AINP 120 determines business rules for the session. AINP 120 obtains John's subscriber profile including his billing information and confirms that John's device supports video. AINP 120 then determines (e.g., by querying an external data source, presence and/or other network platforms) whether Mary's preferred communication device can support video (on her profile, Mary is able to specify what type of sessions she wants to receive, on which devices, and when). AINP 120 determines whether Mary is on a block list (e.g., a black/white list). AINP 120 then checks to see that John is allowed to terminate a session to a roaming URI and whether Mary can receive video sessions while roaming. AINP 120 determines, based on the carrier's business rules, the best way to terminate the video session to Mary and, based on John's profile, whether to provide a high or low quality video session to Mary. AINP 120 selects a list of suppliers to use to terminate the video session and sends this BVR to SDP 115. At the end of call, AINP 120 receives records which show session durations, which part of the session was voice or video, and other information used for reporting, billing, etc.

Multi Media Session: In an embodiment, AINP 120 manipulates a multi-media session. In this exemplary illustration, there is a service called Remote Doctor Video Services which allows multi-media sessions to be initiated by SMS (i.e., doctor is received in somewhat real time), email (delayed response is received) or voice (immediate/real time response is received). For example, a subscriber, "John," requests immediate doctor services and initiates a call using a voice session. John calls a dedicated toll free number and, when the voice session has been initiated, the switch (i.e. SDP 115 in this example) sends the call to AINP 120. AINP 120 analyzes at the session profile information and determines that the toll free number is associated with video doctor services and, based upon this information, initiates a session with an external platform which validates John's billing information (to authorize him to receive the doctor services). AINP 120 also initiates a request to John and John responds by providing information such as his credit card number, expiration date, name, contact info, description of ailment, etc. Once John provides this information, AINP 120 receives a message that the video service has been validated and a billing rate for the service. AINP 120 identifies, using John's origination location and doctor location information, which doctors are closest to. AINP 120 locates a selection of doctors which fit John's information and checks the doctors' presence to identify how the doctor wants to connect to the subscriber (e.g, blackberry, iPad, etc), determines devices compatible with John, and confirms the video capability of their device. Based on John's location and the doctor's presence and location, AINP 120 determines the doctor(s) to use for the video service, determines the best supplier(s) to use to terminate the session to the doctor's device, and forwards John's information to the carrier, SBP 115 and/or the doctor. At the end of call, AINP 120 receives the records which show session durations, which part of the session was voice or video, and other information used for reporting, billing, etc.

With reference now to FIG. 5, the session which the signaling node receives from SDP 115 contains session parameters (Step 505). In various embodiments, session parameters may include, for example, called party ID/called party IP/URI, calling party ID/calling party IP/URI, calling party name, incoming trunk group/session or origination IP or ID/URI, subscriber location information, service ID, device information, automatic number identification (ANI) data, dialed number identification service (DNIS) data, subscriber identifier, subscriber IP address, subscriber name, incoming trunk group, session identifier, origination IP address, subscriber location data and service identifier. The session parameters allow AINP 120 to retrieve the subscriber 101's (e.g., calling party) customer profile and validate their account (Step 515). In an embodiment, if the account is determined to be invalid (Step 520), the session is rejected and a cause code is returned to SDP 115 (Step 525).

The customer (i.e., subscriber) profile contains routing policy distribution preferences which help AINP 120 determine how the subscriber would like their session routed. Using custom unique logic to determine BVR for the session, AINP 120 organizes the routing parameters based on their order of importance (Step 530), determines one or more logic and/or optimization modules and invokes the modules, and analyzes the session using the selected criteria (Step 535). AINP 120 sends the resulting BVR to the SDP 115 (Step 545) which terminates the session (e.g., completes the network connection between subscriber device 101 and subscriber services 130.

In various embodiments, AINP 120 includes a plurality of logic and/or optimization modules the enable intelligent routing. Such modules may include, for example:

Service Workflow Logic (SWL)—In an embodiment, AINP 120 is configured to execute an SWL module. The SWL module is configured, for example, to obtain data, analyze and execute complex business intelligence rules and drive and control complex processes. In an embodiment, SWL module may execute complex mathematical and/or statistical techniques such as, for example, fuzzy logic, simulations, artificial intelligence, or the like in order to enable and/or support real-time business intelligence.

Least Cost Routing (LCR)—When a service carrier routes call, LCR module routes calls based on the lowest active cost provided by carriers. In an embodiment, LCR module uses [NPA-NXX$^{th}$] to process the international/offshore calls. LCR module can also use the dialed number to analyze the associated Inter/Intra State or local access and transport area (LATA) and/or operating company number (OCN) rates to determine the routes.

Quality & Network Optimization—This module utilizes information about the quality of routes to determine the route selection for each call. In an embodiment, route quality is determined by analyzing previous call data records (CDRs) or integrating with a switching device to gather statistics on answer seizure ratio (ASR) (e.g., ratio of how many calls are being connected) and post dial delay (PDD) for use in the analysis.

Time Based Routing—Service Provider/Carrier rates and routing options often fluctuate on a constant basis and are subjective based on the time of day. In an exemplary embodiment, a time based routing module takes into account the Time of Day, Day of Week, Month or Year enabling providers/carriers to offer certain rates/routes at certain periods of time.

Number Portability—The number portability module enables AINP 120 to determine if a number has been ported and retrieve the local routing number in order to properly execute the routing options.

Carrier Commitment/Profile Routing—In an embodiment, AINP 120 imports Carrier Rates based on different formats. Calls are routed using a complex algorithm that allows the client to route calls to carriers based on cost while meeting carrier commitments. Carriers also have the capability to change the carrier rating based on volume commitments or accomplishments.

Customer Profile Routing—This module allows for routing based on the customer profile by using the ANI (Caller ID) or the incoming trunk group. For example, if this customer were considered a high-profile customer, then a high quality route would be used to terminate their calls.

Custom Routing—Customer routing rules can be created based on business/customers unique requirements. Such a capability to connect to numerous data sources enables a vast array of routing control options.

With reference again to FIG. 3, an embodiment of the present invention provides a method for a service provider to maintain their current session costs and network topology through a central command and control web graphical user interface, GUI 325. This exemplary method involves the input of network topology information related to APIs, signaling interconnection points to network elements and the associated cost, location and quality metrics, and business policies of goods, services, applications and sessions. The AINP 120 automatically applies business analytics to optimize each session as it relates to the customer and network details.

As discussed briefly above, AINP 120 includes GUI 325 which is easy to use while maintaining user level security access. Depending on permissions, users view, edit and delete system elements (e.g., supplier/carrier profiles). In an embodiment, from a login screen, the user submits their user name and password to access the Home screen of the application. The central part of a Home screen displays graphs of real time data, such as, for example, daily session summaries, top supplier by minutes, and session summary by hour and by month. In one embodiment, a portion of the Home screen displays a navigation menu from where users may expand or minimize root folders and select sub-menus to navigate to each section of GUI 325. Menu items are grouped according to function. For example, an Administration folder may allow users to manage elements such as, for example, to users, alerts and audits as well as perform network-related administration tasks. A Routing folder allows users to set up the components for session routing such as subscriber profile, cost, quality metrics, business policies, location, network topology, and application/device profile. A Reports section may allows users to run predefined and ad hoc reports to analyze traffic, cost, profitability and other useful metrics.

In an embodiment, GUI 325 is used to view and configure settings for suppliers which provide services for entertainment-related applications (such as but not limited to TV, gaming and video service suppliers), goods and services-related applications (such as but not limited to car service and food order suppliers), and communication-related applications (such as but not limited to peer to peer, LTE/IMS, MMS and voice service suppliers).

From GUI 325, users can configure elements such as rate information by application (such as but not limited to duration and bytes), supplier specialized rounding/rating schemes, location based routing/rating schemes, client profile details, and other network configuration parameters. Actions which users perform via the GUI include adding, deleting, updating, searching for, importing, and exporting elements.

Figure 6:
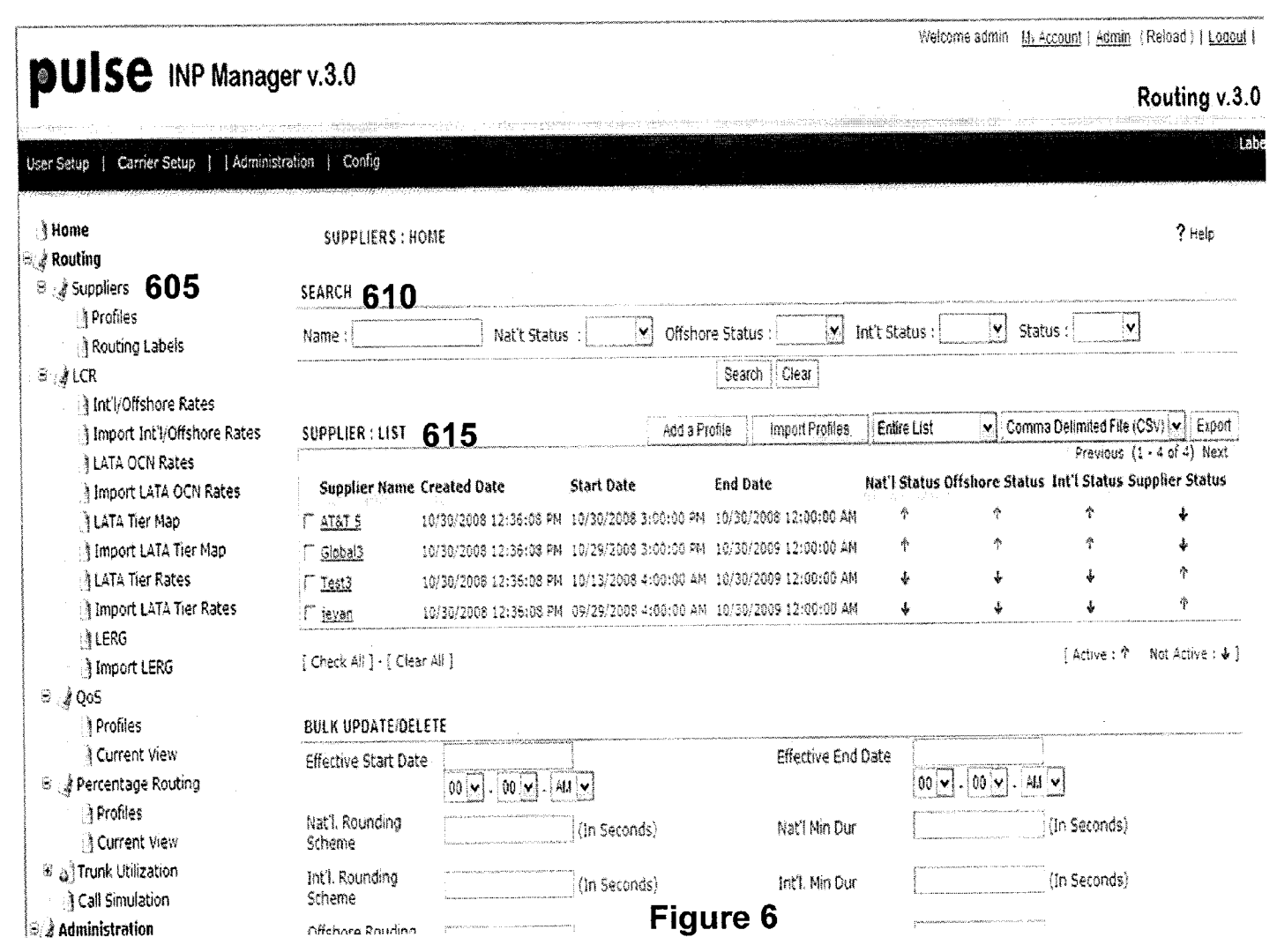

With reference now to FIG. 6, an exemplary supplier screen GUI is shown. From the supplier screen, users can perform actions such as but not limited to adding a supplier profile, importing and exporting one or multiple supplier profiles, viewing the supplier list (including but not limited to information such as national, international and offshore status), searching for a supplier profile, viewing a supplier profile, editing a supplier profile, or deleting a supplier profile.

A number of reports can be run via GUI 325 which allow users to, for example, analyze traffic by peek sessions per second (such as but not limited to by hour, day or month), by session volume (such as but not limited to by hour, day or month), and profitability (such as but not limited to by hour, day or month). Predefined reports are available out of the box with the application, as well as ad hoc or custom reports that can be developed to meet specific business requirements. Reports use data derived from session detail records.

Reports also enable companies to perform GAP analysis. This is important in session routing because, in some cases, the first routing option may not be used due to failure reasons such as congestion, lack of service, or temporary network issues. When this occurs, the next routing option is used to terminate the session. A GAP analysis reviews the completed (terminated) sessions to determine where alternate routing options were used and analyzes the resulting margin differential.

In an embodiment, to run a report, the user opens the report from the web GUI, selects the report criteria and generates the report. Report results can be viewed in HTML or exported to another format (such as but not limited to MS Excel) and saved to a local computer.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, when a phrase similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C. Although the invention has been described as a method, it is contemplated that it may be embodied as computer program instructions on a tangible computer-readable medium or carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. An advanced intelligent network platform (AINP) system for real-time determination of a best value route for transporting content across a network, the AINP system comprising:
    a network interface communicating with a memory;
    the memory communicating with a processor; and
    the processor, when executing a computer program, configured to:

receive a request from a service delivery platform (SDP), wherein the request includes session parameters, wherein the session parameters include an origin and a destination;
retrieve from the memory, based upon the session parameters, a session profile;
determine, based upon the session parameters and the session profile, a plurality of route optimization modules and an execution order of the plurality of route optimization modules;
execute the plurality of route optimization modules in the determined execution order;
determine, based upon the executing, the best value route (BVR) for routing the content from the origin to the destination;
provide the BVR.

2. The system of claim 1, wherein providing the BVR comprises providing the BVR to at least one of the SDP, a device associated with a subscriber, the origin, the destination, a service provider and a carrier.

3. The system of claim 1, wherein the session profile comprises a subscriber profile.

4. The system of claim 1, wherein the processor, when executing the computer program, is further configured to apply real time intelligence within a session flow.

5. The method of claim 4, wherein applying real time intelligence comprises querying a data source to obtain at least one of business intelligence rules, session profile information, subscriber profile information, service logic procedures, workflow data, cost data, routing data, network status data and network bandwidth data.

6. The system of claim 1, wherein the session parameters further comprise automatic number identification (ANI) data, dialed number identification service (DNIS) data, subscriber identifier, subscriber IP address, subscriber name, incoming trunk group, session identifier, origination IP address, subscriber location data and service identifier.

7. The system of claim 1, wherein at least one of a source network type and a destination network type are associated with at least one of a wireless network, a mobile network, a wireline network and an IP network.

8. The system of claim 1, wherein the BVR comprises at least one of a route, a routing table, a plurality of routes, a plurality of routing tables, a result code, a subscriber identifier, a subscriber IP address, a carrier identifier, a service provider identifier and a calling party name, and wherein the SDP completes a service request based upon the BVR.

9. The system of claim 1, wherein the BVR comprises at least one of a plurality of routes and concurrent routing to multiple networks.

10. The system of claim 1, further comprising determining that a subscriber account associated with a subscriber is valid, wherein the SDP receives a service request from the subscriber.

11. The system of claim 1, wherein the plurality of route optimization modules comprises at least one of a service workflow logic module, a location based module, a quality module, a least cost module, a carrier commitment module, a time based routing module, and a customer preference module.

12. The system of claim 1, wherein the determining an execution order comprises determining a priority percentage for each of the plurality of routing modules.

13. The system of claim 1, wherein the processor, when executing the computer program, is further configured to obtain, based upon the session parameters, at least one of network attributes, carrier profile, routing policy, terminating entity profile, network quality parameters, network optimization data, and local number portability data.

14. The system of claim 1, wherein a quality and network optimization module analyzes at least one of call data records, answer seizure ratio data, and post dial delay data to optimize the BVR, wherein the plurality of route optimization modules comprises the quality and network optimization module.

15. The system of claim 1, wherein a carrier commitment module analyzes at least one of carrier commitment and a subscriber profile to optimize the BVR, wherein the plurality of route optimization modules comprises the carrier commitment module.

16. The system of claim 1, wherein a customer profile routing module analyzes at least one of automatic number identification (ANI) data and incoming trunk group data to optimize the BVR, wherein the plurality of route optimization modules comprises the customer profile routing module.

17. The system of claim 1, wherein a custom routing module analyzes at least one of predetermined rules, subscriber business rules, carrier business rules and requested service routing rules to optimize the BVR, wherein the plurality of route optimization modules comprises the custom routing module.

18. The system of claim 17, wherein the custom routing module filters a list of possible service providers based upon business intelligence rules.

19. The system of claim 17, wherein the custom routing module modifies data associated with at least one of automatic number identification (ANI), dialed number identification service (DNIS), incoming trunk, origination IP address, origination switch device, location, presence information, and Direct inward dialing (DID).

20. The system of claim 1, wherein the BVR is determined based upon at least one of network metrics, variance in network metrics, source metrics, an originating number, cost policies, business policies, an originating IP address, uniform resource identifier, a destination number, a destination IP address, destination metrics, quality of service, cost, location, number portability, carrier commitment and customer profile.

21. The system of claim 20, wherein business polices include at least one of specific contracts and operating procedures specific to a company, wherein the execution of the business policies result in a specific desired behavior of the session control.

22. The system of claim 1, wherein the SDP comprises at least one of a session control device, a switching platform, a class 4 switch, a class 5 switch, a class 4/5 switch, a next generation network (NGN) platform, a mobile switching center (MSC), a router, a gateway, a service broker gateway, an IMS framework, a call session control function (CSCF) device, a proxy server, a session initiated protocol (SIP) server, a SIP/enum server, an LTE framework, an evolved packet core (EPC), an SS7node, a SIGTRAN node and a multimedia resource function (MRF) server.

23. The system of claim 1, wherein at least one of:
a location based module determines a plurality of service providers based upon a location to complete a service request, wherein the location is based upon at least one of a requesting location and a terminating location, and wherein the plurality of route optimization modules comprises the location based module, and
a time based routing module analyzes time based routing data to optimize the BVR, wherein the plurality of route optimization modules comprises the time based routing module.

24. A computer-based method for real-time determination of a best value route for transporting content across a network, the method comprising:
- receiving, at a computer, a request from a service delivery platform (SDP), wherein the request includes session parameters, wherein the session parameters include an origin and a destination;
- retrieving, by the computer, from a memory, based upon the session parameters, a subscriber profile;
- determining, by the computer, based upon the session parameters and the subscriber profile, a plurality of route optimization modules and an execution order of the plurality of route optimization modules;
- executing, by the computer, the plurality of route optimization modules in the determined execution order;
- determining, by the computer, based upon the executing, the best value route for routing the content from the origin to the destination;
- providing, by the computer, the best value route to at least one of the SDP, a device associated with a subscriber, the origin, the destination, a service provider and a carrier.

25. A non-transitory computer-readable medium having computer-executable instructions stored thereon that, if executed by a computer for real-time determination of a best value route for transporting content across a network, cause the computer to perform operations comprising:
- receive a request from a service delivery platform (SDP), wherein the request includes session parameters, wherein the session parameters include an origin and a destination;
- retrieve, from a memory, based upon the session parameters, a subscriber profile;
- determine, based upon the session parameters and the subscriber profile, a plurality of route optimization modules and an execution order of the plurality of route optimization modules;
- execute the plurality of route optimization modules in the determined execution order;
- determine, based upon the executing, the best value route for routing the content from the origin to the destination;
- provide the best value route to at least one of the SDP, a device associated with a subscriber, the origin, the destination, a service provider and a carrier.

* * * * *